United States Patent
Dang et al.

(10) Patent No.: US 11,876,233 B2
(45) Date of Patent: Jan. 16, 2024

(54) THIN FILM BATTERY STACKING

(71) Applicant: International Business Machines Corporation, Armonk, NY (US)

(72) Inventors: Bing Dang, Chappaqua, NY (US); John Knickerbocker, Orange, NY (US); Qianwen Chen, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 16/796,636

(22) Filed: Feb. 20, 2020

(65) Prior Publication Data

US 2021/0265606 A1   Aug. 26, 2021

(51) Int. Cl.
| | | |
|---|---|---|
| *H01M 50/10* | (2021.01) | |
| *H01M 10/0585* | (2010.01) | |
| *H01M 50/502* | (2021.01) | |

(52) U.S. Cl.
CPC ....... *H01M 50/10* (2021.01); *H01M 10/0585* (2013.01); *H01M 50/502* (2021.01)

(58) Field of Classification Search
None
See application file for complete search history.

(56) References Cited

U.S. PATENT DOCUMENTS

| | | |
|---|---|---|
| 6,900,114 B2 | 5/2005 | Ohmi et al. |
| 7,368,332 B2 | 5/2008 | Moriwaki et al. |

(Continued)

FOREIGN PATENT DOCUMENTS

| | | |
|---|---|---|
| CN | 109119702 A | 1/2019 |
| WO | WO2010100599 | 9/2010 |

(Continued)

OTHER PUBLICATIONS

U.S. Appl. No. 17/366,521, filed Jul. 2, 2021.

(Continued)

*Primary Examiner* — Stewart A Fraser
(74) *Attorney, Agent, or Firm* — Michael O'Keefe

(57) ABSTRACT

Thin Film Batteries are made of battery layers. Each battery layer has a substrate with one or more battery structures on the substrate surface. The battery structures have a first electrode connection and a second electrode, a first electrode (e.g. a cathode or anode) is electrically connected to the first electrode connection and a second electrode (e.g. an anode or cathode) is electrically connected to the second electrode connection. An electrolyte is at least partial disposed between and electrically connected to the first and second electrodes. A first edge connection on one of the substrate edges is physically and electrically connected to the first electrode connection. A second edge connection on one of the substrate edges is physically and electrically connected to the second electrode connection. An electrically insulating lamination is disposed on the substrate and covers the components except for the first and second edge connections, connected to respective battery electrodes. A first stack external connection electrical connects two or more of the first edge connections and a second stack external connection electrical connects two or more of the second edge connections. A first and second battery pole are connected to the respective first and second stack external connections. The TFBs are hermetically sealed.

17 Claims, 12 Drawing Sheets

(56) References Cited

U.S. PATENT DOCUMENTS

| | | | |
|---|---|---|---|
| 8,889,295 | B2 | 11/2014 | Yushin et al. |
| 9,252,415 | B2 | 2/2016 | Askarinya et al. |
| 9,728,494 | B2 | 8/2017 | Biederman et al. |
| 9,748,582 | B2 | 8/2017 | Bhardwaj |
| 10,079,403 | B2 | 9/2018 | Grady et al. |
| 10,581,109 | B2 | 3/2020 | de Souza et al. |
| 10,644,356 | B2 | 5/2020 | de Souza et al. |
| 10,777,842 | B2 | 9/2020 | de Souza et al. |
| 2007/0238019 | A1 | 10/2007 | Laurent et al. |
| 2009/0136839 | A1* | 5/2009 | Kraznov .............. H01M 6/186 |
| | | | 429/160 |
| 2011/0146064 | A1 | 6/2011 | Feaver et al. |
| 2014/0147731 | A1 | 5/2014 | Anastas et al. |
| 2015/0280201 | A1* | 10/2015 | Bhardwaj ......... H01M 10/0436 |
| | | | 429/160 |
| 2016/0111699 | A1 | 4/2016 | Ahn et al. |
| 2017/0069883 | A1 | 3/2017 | Jarry |
| 2017/0098823 | A1 | 4/2017 | Yushin et al. |
| 2017/0288272 | A1 | 10/2017 | Kwak et al. |
| 2018/0083318 | A1* | 3/2018 | Johnson ............ H01M 10/0585 |
| 2019/0051943 | A1 | 2/2019 | Horibe et al. |
| 2019/0115625 | A1 | 4/2019 | Sadana et al. |
| 2019/0214082 | A1 | 7/2019 | Li et al. |
| 2020/0014058 | A1 | 1/2020 | de Souza et al. |
| 2020/0014060 | A1 | 1/2020 | de Souza et al. |
| 2020/0020895 | A1 | 1/2020 | Collins et al. |
| 2020/0212492 | A1 | 7/2020 | Collins et al. |
| 2020/0335826 | A1 | 10/2020 | Collins et al. |
| 2020/0014018 | A1 | 11/2020 | de Souza et al. |
| 2020/0014059 | A1 | 11/2020 | de Souza et al. |
| 2020/0395628 | A1 | 12/2020 | Collins et al. |
| 2020/0403190 | A1 | 12/2020 | Collins et al. |
| 2021/0151719 | A1 | 5/2021 | Collins et al. |
| 2021/0399275 | A1 | 12/2021 | Collins et al. |
| 2021/0399346 | A1 | 12/2021 | Collins et al. |

FOREIGN PATENT DOCUMENTS

| | | |
|---|---|---|
| WO | WO2011156419 A2 | 12/2011 |
| WO | WO2017/093074 | 11/2016 |
| WO | WO2019077426 A1 | 4/2019 |
| WO | WO2020008285 A1 | 1/2020 |

OTHER PUBLICATIONS

U.S. Appl. No. 16/994,813, filed Aug. 17, 2020.

Bing Dang et al, "Novel Packaging Structure and Processes for Micro-TFB (Thin Film Battery) to Enable Miniaturized Healthcare Internet-of-Things (IoT)Devices", 2019 IEEE 69 Electronic Components and Technology Conference (ECTC), IBM T.J. Watson Research Center and Front Edge Technologies, Inc.

PCT ISOA, International Search Report and Written Opinion of the ISA, dated May 7, 2021.

List of IBM Patents or Applications Treated as Related.

\* cited by examiner

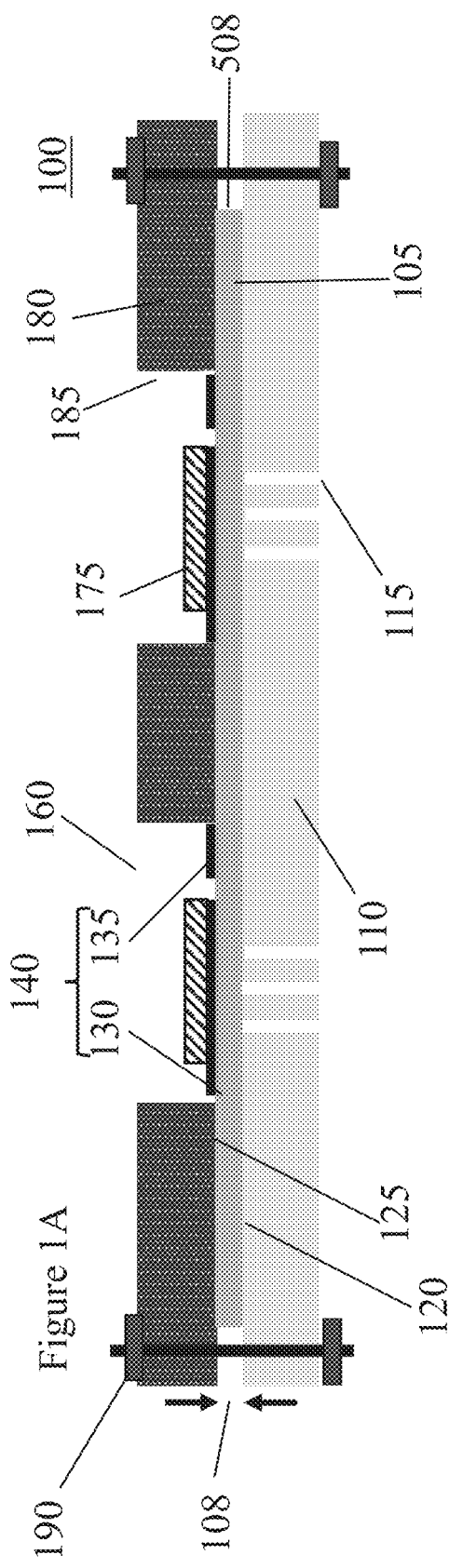
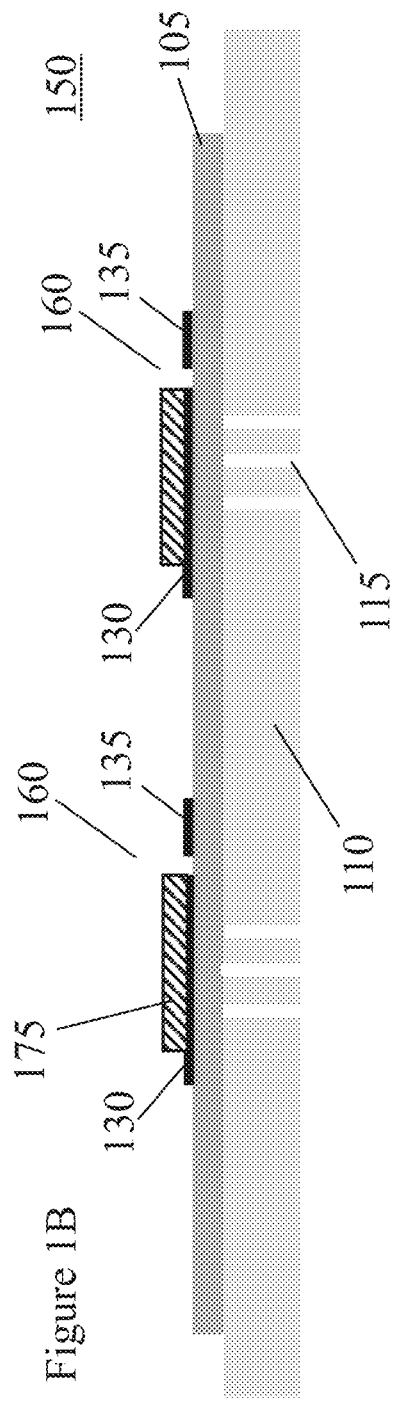

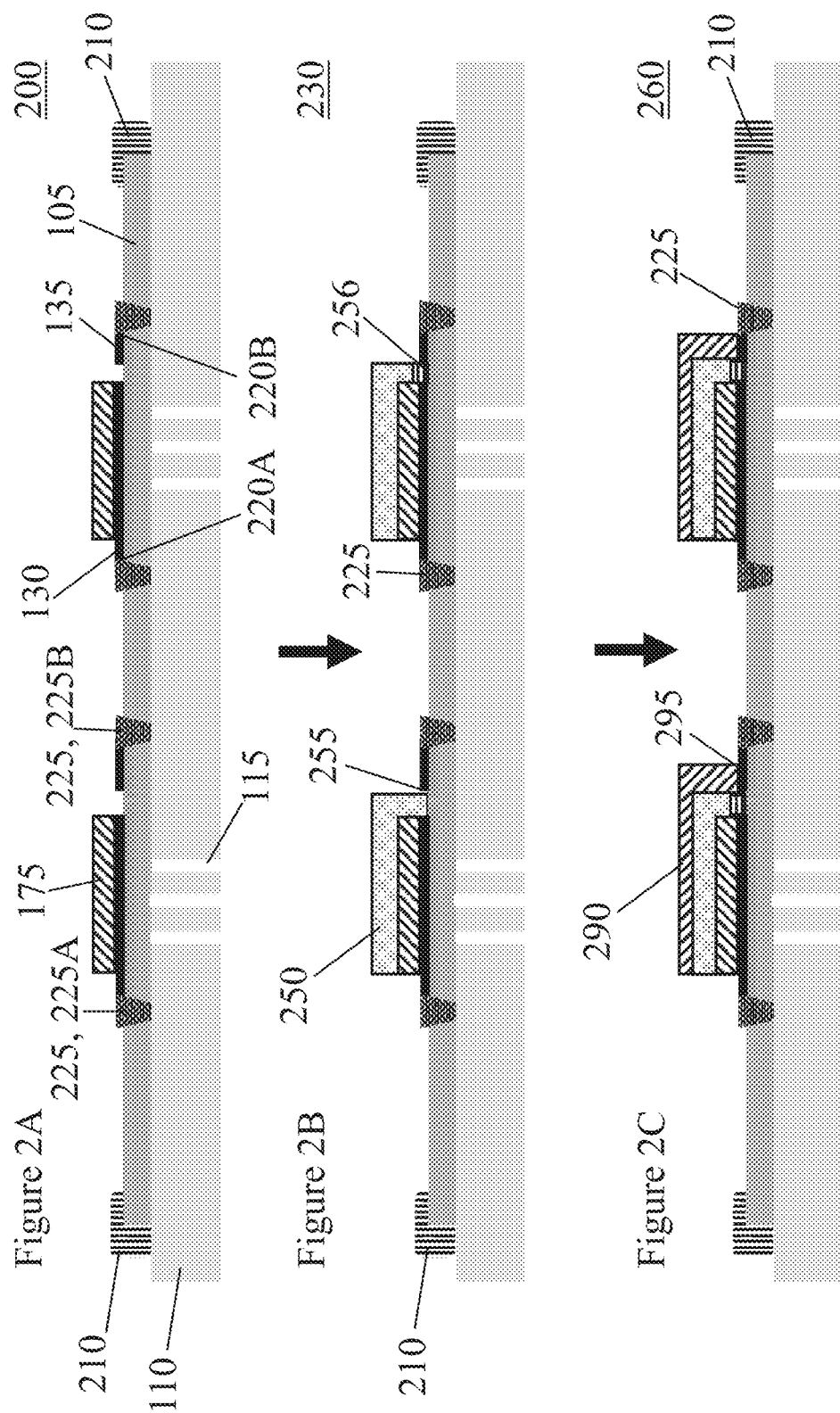

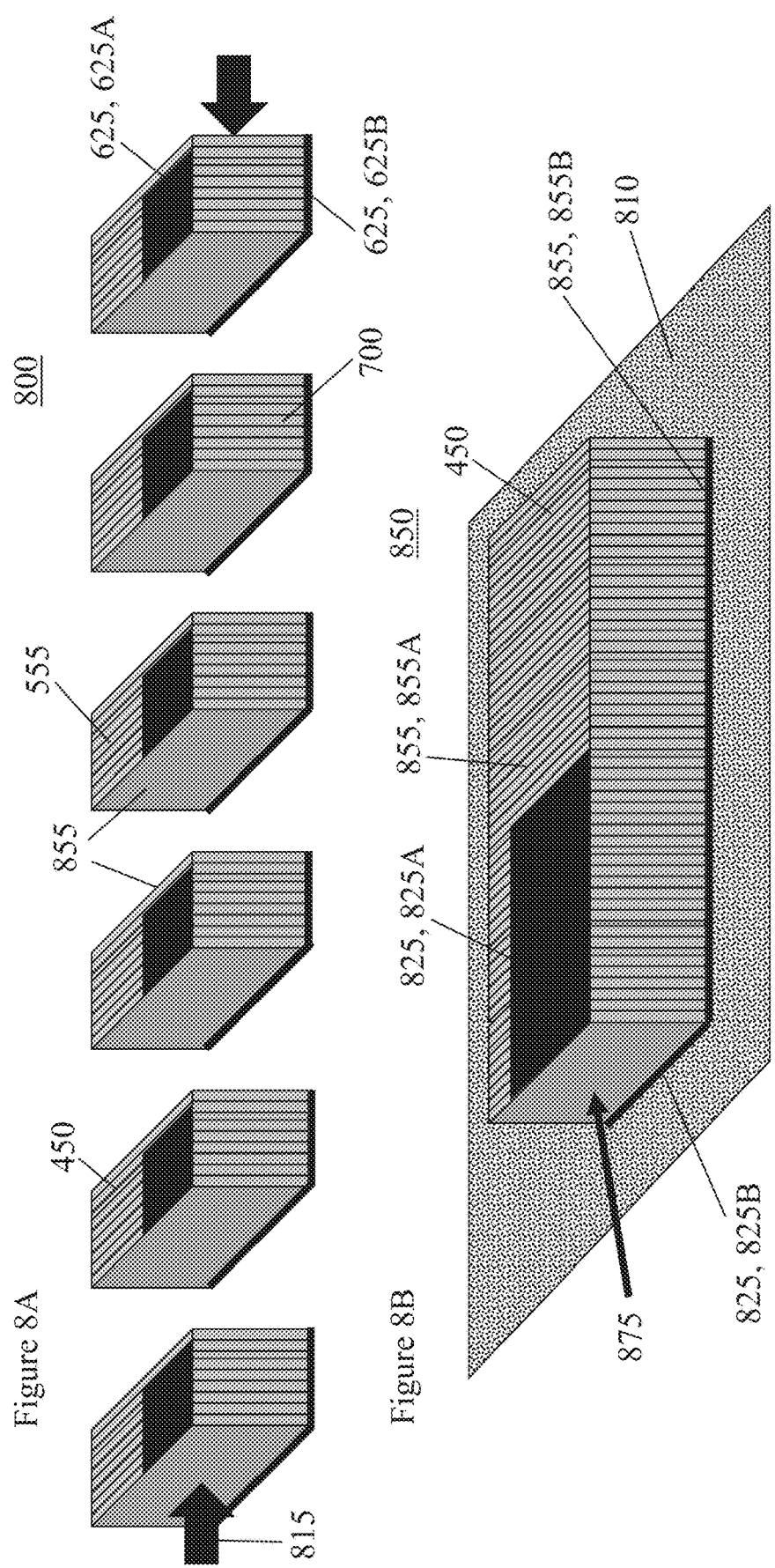

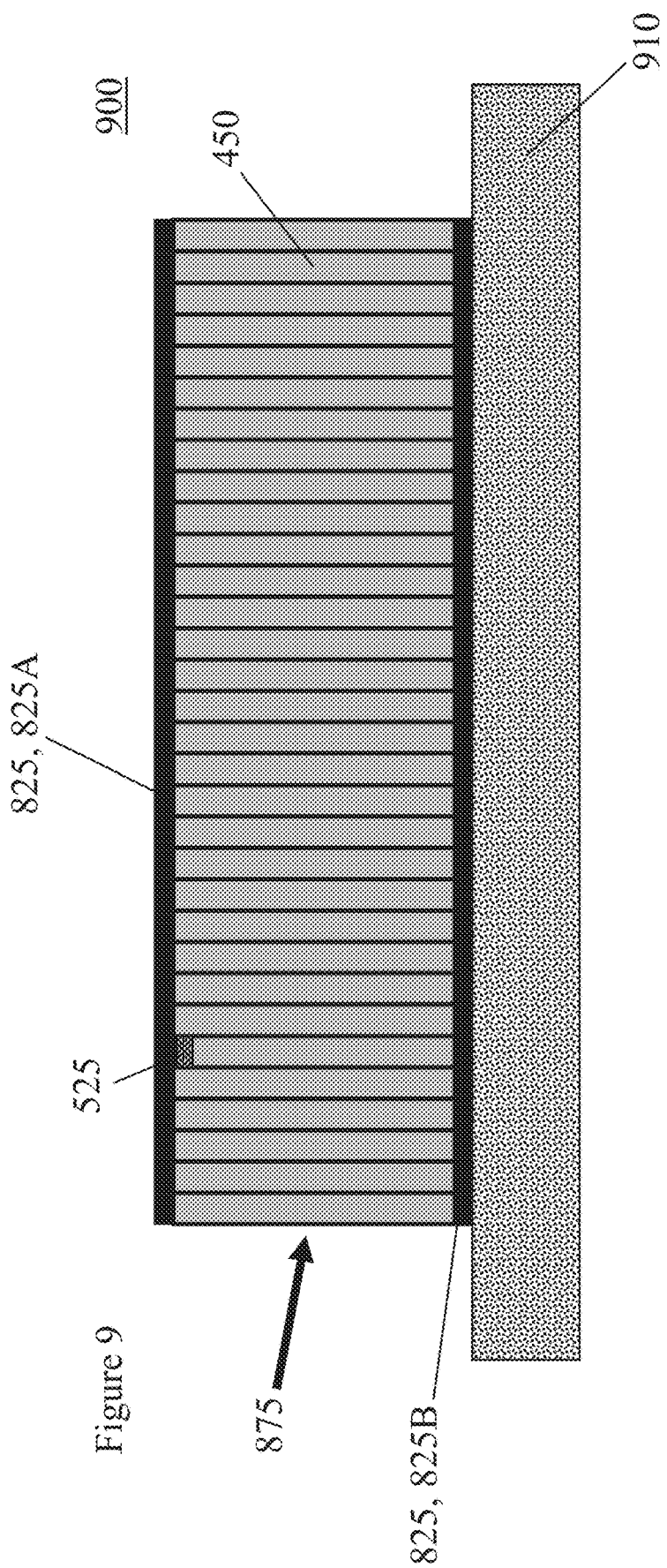

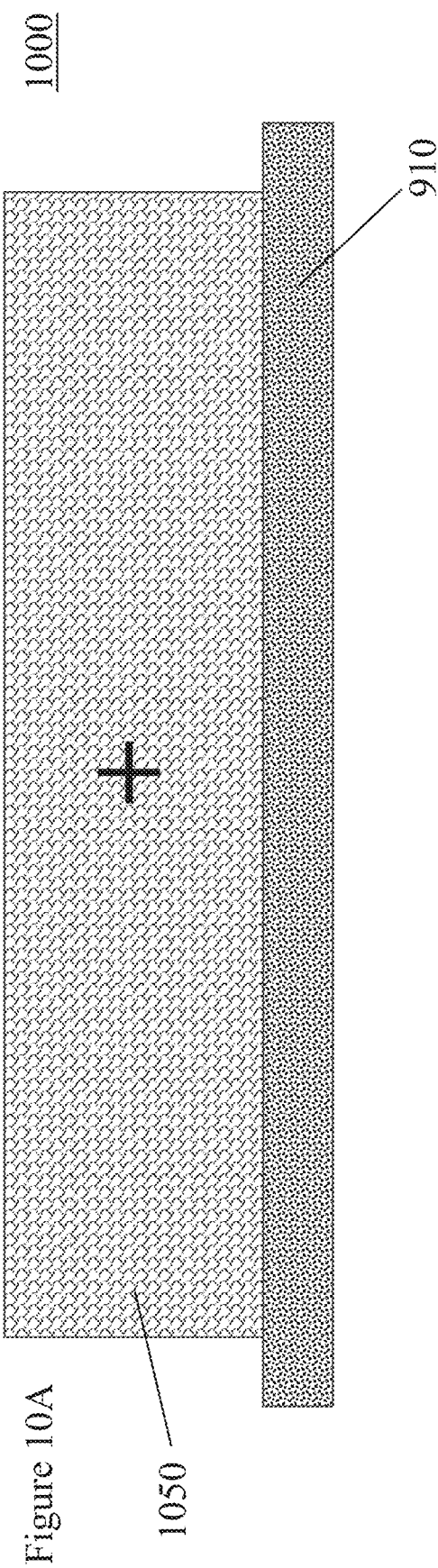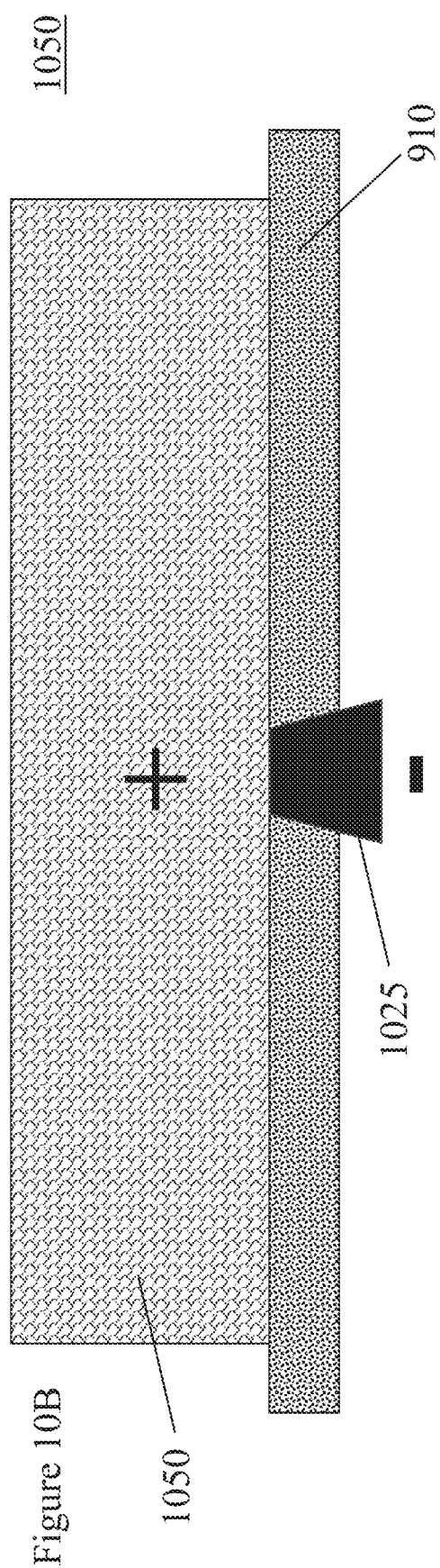

THIN FILM BATTERY STACKING

BACKGROUND

The present invention relates to power storage devices, and more specifically, to thin film battery structures and methods of making thin film battery structures.

Current builds of thin film batteries (TFBs) often use a support substrate or integrated battery carrier material, with a thickness in the range of 50 micrometers (um) to 200 um, which provides mechanical integrity and a flat base for thin film single battery build or multi-layer build. While these carriers support higher yield builds in prototyping and manufacturing, unfortunately the thickness of the support substrate and sealing layer can be greater than 25% to 75% of the total battery thickness for single layer batteries or per battery layer for stacked TFBs such as solid state TFBs. For example, for a fabricated single layer battery of between 100 um to 200 um in total thickness, the substrate and seal layer may be 50 um to 150 um thick whereas the TFB cathode, electrolyte, and anode combined may be only 25 um to 50 um thick.

Therefore, use of current support substrates/battery carriers leads to lower energy density by volume and lower energy density by weight which can limit applications for these energy storage devices. Attempts to reduce the thicknesses of the support substrate or integrated battery carrier material can lead to stresses in the support substrate/battery carrier and TFB during processing. These stresses can be caused by differences in coefficients of thermal expansion (CTE) of the substrate and battery components (e.g. the cathode, electrolyte, anode, connections, and sealing materials) combined with temperature cycling (e.g. between room temperature to higher processing temperatures).

Material properties such as the coefficient of thermal expansion is the tendency of matter to change its shape, area, and/or volume in response to a temperature change. Thermal expansion of different materials bound together in a module/package, e.g. a battery, can cause the battery to warp as temperature cycles up and/or down resulting in stresses and component and interconnection failures.

Further, by using reduced sealing layers thickness at the peripheral edge of the TFB as well as on the top and bottom of the battery for encapsulation, interconnections for single layer, and especially for multi-high stacked and preferred single layer or multi-layer high energy density batteries become more difficult to achieve in very small battery form factors.

TFBs have rapidly increasing uses in many applications, including the Internet of Things (IoT) and medical devices and sensors.

There is a need for thinner, higher energy density, and hermetically sealed power storage devices, e.g. batteries, that can be made efficiently with high yields using current TFB fabrication techniques that are compatible with available, automated assembly tools.

SUMMARY

Embodiments of the present invention include a stack of a plurality of battery layers. Each of the thin film battery structures comprise battery layers on a substrate. The substrate has a top surface, a bottom surface, and one or more substrate edges. One or more Thin Film Batteries (TFBs) or integrated battery structures are disposed on the top surface of the substrate. The battery structures have a first electrode connection and a second electrode connection disposed on the top surface of the substrate. The first and second electrode connections are not electrically connected. A first electrode (e.g. a cathode or an anode) is electrically connected to the first electrode connection and at least part of the first electrode is disposed on the first electrode connection. A second electrode (e.g. an anode or a cathode) is electrically connected to the second electrode connection and at least part of the second electrode is disposed on the second electrode connection. An electrolyte is at least partial disposed between and electrically connected to the first and second electrodes. A first edge connection on one of the substrate edges is physically and electrically connected to the first electrode connection. A second edge connection on one of the substrate edges is physically and electrically connected to the second electrode connection. An electrically insulating lamination is disposed on the substrate and covers the first connection except for the first edge connection, the second connection except for the second edge connection, the anode, the electrolyte, and the cathode. A first stack external connection electrically connects two or more of the first edge connections and a second stack external connection electrically connects two or more of the second edge connections forming a TFB cell stack. A first and second battery pole are connected to the respective first and second stack external connections. In some embodiments, TFB cell stacks are stacked together to form larger modules/batteries. Methods of making TFBs are disclosed. The TFBs are hermetically sealed.

BRIEF DESCRIPTION OF THE DRAWINGS

Various embodiments of the present invention will be described below in more detail, with reference to the accompanying drawings, now briefly described. The Figures show various apparatus, structures, and related process steps of the present invention.

FIG. 1A is an elevation view of a thin, flat, electrically insulating substrate that is fixed within a sandwich structure of compression plates and/or temporary handlers.

FIG. 1B is an elevation view of a thin, flat, electrically insulating substrate that is fixed on a suction handler.

FIG. 2A is an elevation view of a substrate with a first electrode on each of one or more precursor battery structures.

FIG. 2B is an elevation view of a substrate with a first electrode and an electrolyte on each of one or more precursor battery structures.

FIG. 2C is an elevation view of a substrate with one or more battery structures, each having a first electrode, an electrolyte, and a second electrode.

FIG. 8A is a drawing of a plurality of TFB cell stacks being stacked into a TFB module.

FIG. 8B is an isometric drawing of a TFB module.

FIG. 9 is an elevation view of a TFB module on a substrate.

FIG. 10A is an elevation view of a TFB module with a hermetic sealing cap as a first external module connection or first battery pole.

FIG. 10B is an elevation view of a TFB module with a hermetic sealing cap as a first battery pole and a second battery pole passing through a substrate.

DETAILED DESCRIPTION

Figure 3:
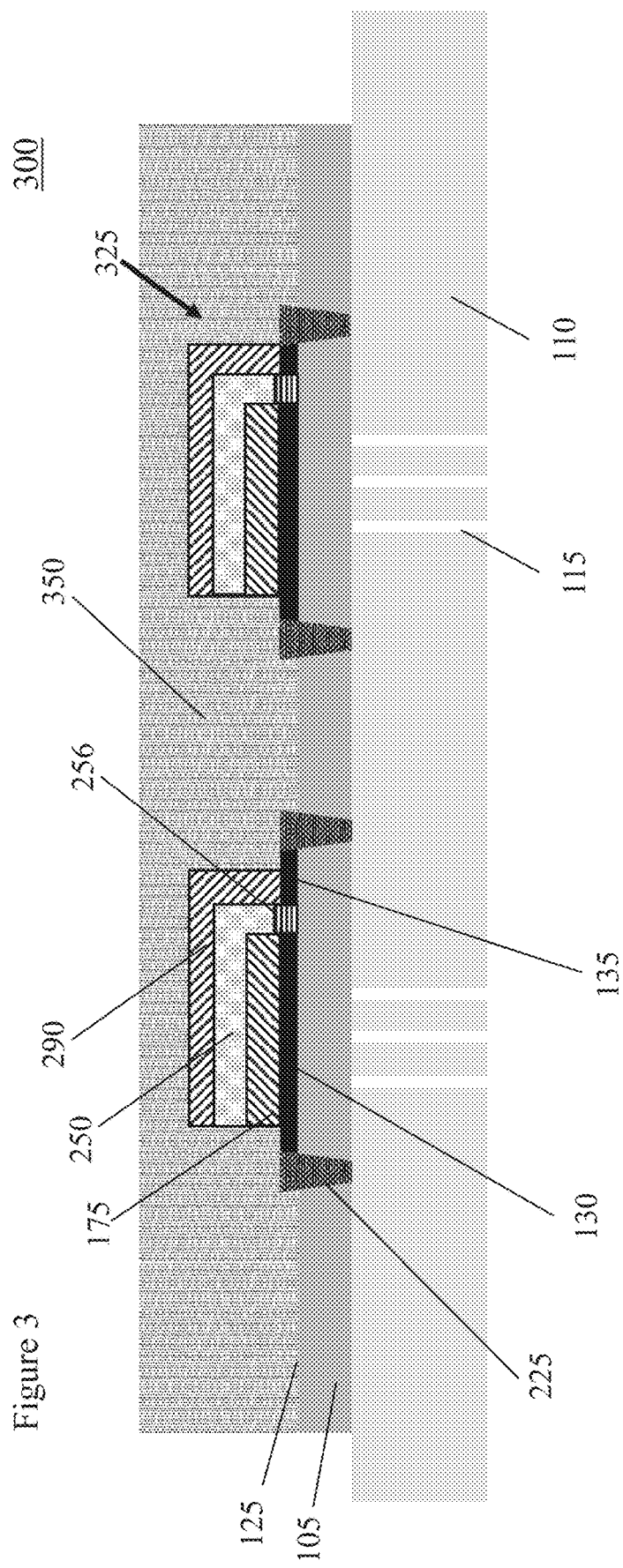
FIG. 3 is an elevation view of a layer containing a substrate with one or more battery structures covered by an electrically insulating lamination layer.

It is to be understood that embodiments of the present invention are not limited to the illustrative methods, apparatus, structures, systems and devices disclosed herein but instead are more broadly applicable to other alternative and broader methods, apparatus, structures, systems and devices that become evident to those skilled in the art given this disclosure.

In addition, it is to be understood that the various layers, structures, and/or regions shown in the accompanying drawings are not drawn to scale, and that one or more layers, structures, and/or regions of a type commonly used may not be explicitly shown in a given drawing. This does not imply that the layers, structures, and/or regions not explicitly shown are omitted from the actual devices.

In addition, certain elements may be left out of a view for the sake of clarity and/or simplicity when explanations are not necessarily focused on such omitted elements. Moreover, the same or similar reference numbers used throughout the drawings are used to denote the same or similar features, elements, or structures, and thus, a detailed explanation of the same or similar features, elements, or structures will not be repeated for each of the drawings.

The semiconductor devices, structures, and methods disclosed in accordance with embodiments of the present invention can be employed in applications, hardware, and/or electronic systems. Suitable hardware and systems for implementing embodiments of the invention may include, but are not limited to, personal computers, communication networks, electronic commerce systems, portable communications devices (e.g., cell and smart phones), solid-state media storage devices, expert and artificial intelligence systems, functional circuitry, neural networks, etc. Systems and hardware incorporating the semiconductor devices, power sources, and structures are contemplated embodiments of the invention.

As used herein, "height" refers to a vertical size or thickness of an element (e.g., a layer, trench, hole, opening, etc.) in the cross-sectional or elevation views measured from a bottom surface to a top surface of the element, and/or measured with respect to a surface on which the element is located.

Conversely, a "depth" refers to a vertical size of an element (e.g., a layer, trench, hole, opening, etc.) in the cross-sectional or elevation views measured from a top surface to a bottom surface of the element. Terms such as "thick", "thickness", "thin" or derivatives thereof may be used in place of "height" where indicated.

As used herein, "lateral," "lateral side," "side," and "lateral surface" refer to a side surface of an element (e.g., a layer, opening, etc.), such as a left or right-side surface in the drawings.

As used herein, "width" or "length" refers to a size of an element (e.g., a layer, trench, hole, opening, etc.) in the drawings measured from a side surface to an opposite surface of the element. Terms such as "thick", "thickness", "thin" or derivatives thereof may be used in place of "width" or "length" where indicated.

As used herein, terms such as "upper", "lower", "right", "left", "vertical", "horizontal", "top", "bottom", and derivatives thereof shall relate to the disclosed structures and methods, as oriented in the drawing figures. For example, as used herein, "vertical" refers to a direction perpendicular to the top surface of the substrate in the elevation views, and "horizontal" refers to a direction parallel to the top surface of the substrate in the elevation views.

As used herein, unless otherwise specified, terms such as "on", "overlying", "atop", "on top", "positioned on" or "positioned atop" mean that a first element is present on a second element, wherein intervening elements may be present between the first element and the second element.

As used herein, unless otherwise specified, the term "directly" used in connection with the terms "on", "overlying", "atop", "on top", "positioned on" or "positioned atop," "disposed on," or the terms "in contact" or "direct contact" means that a first element and a second element are connected without any intervening elements, such as, for example, intermediary conducting, insulating or semiconductor layers, present between the first element and the second element.

It is understood that these terms might be affected by the orientation of the device described. For example, while the meaning of these descriptions might change if the device was rotated upside down, the descriptions remain valid because they describe relative relationships between features of the invention.

A Thin Film Battery (TFB) with thinner layers, higher energy density, and good hermetic sealing is disclosed. Structures of stacked and interconnected thin film layers are made by methods that are compatible with currently used TFB processes, materials, and techniques that result in high yields. Flatness of the battery layers is maintained within flatness tolerance specifications to support manufacture of high energy density stacked structure batteries with a small form factor.

TFB structures undergo many formation, building, interconnection, and sealing steps during the manufacture and assembly process. Some of these steps occur at high temperature which can apply large temperature cycles to battery components. Battery components with different CTEs that are bound together undergo warping and thermal/mechanical stresses during these temperature cycles. Warping causes a layer to take up more vertical space, e.g. become thicker. Both warping and thermal/mechanical stress can lead to component failure, leakage paths, intermittent and permanent electrical connection failures, separation of components, component breaks, and other modes of device failures. Later steps in the process, e.g. stacking of battery layers, can also be compromised or lead to lower good battery yields by warping and thermal/mechanical stress.

The present invention uses temporary handlers/fixtures/carriers to maintain the flatness of the thin battery substrate during stress inducing stages of manufacturing, machining, and assembly. In some embodiments, handles enable accurate positioning and placement of battery components (e.g.

cathode, electrolyte, anode, connections, sealers, etc.) to make battery layers. Handles also provide accurate positioning and placement of battery layers to make stacks (cell stacks and/or TFB stacks) and to stack multiple battery layers to make a battery module or module.

Refer now to the Figures.

FIG. 1A is an elevation view 100 of thin, flat, electrically insulating substrate 105 that is fixed within a sandwich structure (110, 180). The substrate 105 has a bottom surface 120, a top surface 125, and one or more edges 508.

One or more pairs 140 of a first electrode connection 130 and a second electrode connection 135 are disposed on the top surface 125 in one or more locations 160 on the top surface 125. The first 130 and second 135 electrode connections are made of electrically conductive material including but not limited to copper (Cu), aluminum (Al), nickel (Ni), silver (Ag), a conductive adhesive, and gold (Au). In each pair 140 of electrode connections (130, 135), the first electrode connection 130 is electrically insulated from the second electrode connection 135, i.e. the first 130 and second 135 electrode connections are not electrically connected.

The first 130 and second 135 electrode connections can be deposited on the substrate 105 top surface 125 by any known technique including but not limited to atomic layer deposition (ALD), chemical vapor deposition (CVD), Plasma Enhanced Chemical Vapor Deposition (PECVD), Radio Frequency Chemical Vapor Deposition (RFCVD,) Physical Vapor Deposition (PVD), Pulsed Laser Deposition (PLD), Liquid Source Misted Chemical Deposition (LSMCD), plating, and/or sputtering. Other methods are contemplated.

In some embodiments, the first electrode connection 130 is a cathode electrode connection 130 and the second electrode connection 135 is an anode electrode connection 135. However, the first electrode connection 130 can be an anode connection 130 and the second connection can be a cathode connection 135. In this description, the electrode connections (130, 135) can be described either way without loss of generality.

In FIG. 1A, a first electrode 175, e.g. a cathode or anode, is physically and electrically connected to the first electrode connection 130. At least part of the first electrode (e.g. cathode or anode) is disposed on the first electrode connection 130.

The substrate 105 thinness will reduce the thickness of the TFB. However, thin substrates 105 may not retain structural integrity and/or flatness while experiencing manufacturing and assembly stresses like temperature swings of up to 700 degrees Celsius (C) during interconnections, material depositions, micro-milling, laser singulation, stacking operations, etc. Accordingly, one or more temporary handlers, e.g. a sandwich structure (110, 180) or a flat, stiff handler 110 is attached to the substrate 105 to maintain substrate 105 integrity during these manufacturing and assembly processes.

The substrate 105 is made of a thin, flat, electrically non-conductive material with a substrate thickness 108 of less than 10 microns (um). In some embodiments, the substrate thickness is between 5 microns and 80 microns.

Example substrate 105 materials include but are not limited to mica, Yttrium stabilized Zirconia (YSZ), ceramic, metal with an electrically insulating coating, and insulating materials dielectric oxides (e.g., silicon oxide, SiOx); dielectric nitrides (e.g., silicon nitride (SiN), silicon boron nitride (SiBN), silicon Boron Carbon Nitride (SiBCN), silicon Carbon Nitride (SiCN); dielectric oxynitrides, (e.g. silicon Oxygen Carbon Nitride (SiOCN), Silicon Carbon Oxide (SiCO), and Silicon Carbide (SiC)); or other dielectric combinations thereof.

In some embodiments, the substrate 105 is flat between 0.5 microns and 5 microns in thickness per square millimeter ($mm^2$) of surface of the substrate 105 with a root mean squared (RMS) of surface roughness between 1 nanometer (nm) and 250 nanometer (nm) per square millimeter ($mm^2$) of surface area of the substrate 105.

In some embodiments, the substrate 105 is supported and retained flat by being attached to one or more temporary handlers (105, 180). The handlers can hold, position, and/or support a single substrate 105 or one or more substrates with layers (or TFB stacks, as described below) during one or more steps of manufacturing including thermal excursions, chemical processing, depositions, etching, and/or assembly of the battery build, micro-milling, singulation and sealing or encapsulation to create smaller batteries, interconnection, assembly, and sealing and functional or other battery testing, etc.

Different steps in the process may require different handlers 110. For example, for material depositions, the handler might require a patterned mask; for singulation, the handler would need to expose one surface of the substrate 105 to a dicing step; for stacking multiple TFBs, the handler may require a release layer and/or an adhesive layer on a battery layer to attach to a stack, etc.

Handlers 110 need to be made of materials that maintain the flatness and/or integrity of the substrate 105 during the mechanical and thermal changes the substrate 105 endures during the manufacturing and assembly process steps. The handlers 110 may need properties like transparency to allow transmission of electromagnetic radiation for ablating a release layer and/or an adhesive attaching the substrate 105 to the handler.

There are multiple embodiments of handler 110. Temporary handler 110 can be made of a flat, stiff material including but not limited to a ceramic plate, glass, silicon, and other semiconductor materials. In one embodiment, the hander 110 is temporarily glued to the substrate 105 bottom 120 with an electromagnetic radiation absorption layer or release layer and/or an adhesive layer placed at the interface of the substrate 105 bottom 120 and the handler 110. (In some embodiments, there will be no electrodes or electrode connections disposed on the substrate 105 bottom 120.) The handler 110 will provide stiffness and support for the substrate 105 until the manufacturing, assembly, and testing steps are completed. The handle 110 can also be used to position the substrate 105 in one or more of the assembly steps. In some embodiments, the substrate 105 and handler 110 are separated with a solvent. In some embodiments, the handler 110 is transparent to some frequencies or wavelengths of electromagnetic radiation. Electromagnetic radiation, e.g. from a laser or alternate source, passes through the transparent handler 110 to ablate the adhesive and separate the substrate 105 from the handler 110.

In some embodiments, the handler 110 is a vacuum mechanical fixture with one or more suction holes 115 drilled through the handler 110. A suction or vacuum is applied through the suction holes 115 to the bottom 120 of the substrate 105, affixing the substrate 105 to the handler 110. When the suction is removed, the substrate 105 is released from the handler 110. By applying and removing suction, one or more handlers 110 can be attached, removed, and re-attached to the substrate 105 or stack.

Alternative handlers 110 and combinations of the handlers (110, 180) disclosed are envisioned.

In some embodiments, one or more compression plates 180 are used to hold the substrate 105 and maintain the substrate 105 flat. In this embodiment, temporary handler 105 and temporary handler (or compression plate) 180 squeeze the substrate 105 between them in a sandwich type structure 100. A compressive force is applied at one or more locations on the compression plates (110, 180) by known techniques 190 including but not limited to clamps, brackets, screws, etc.

The top compression plate 180, e.g. the compression plate 180 bearing on the top surface 125 where there are electrode and contact depositions, can have one or more openings 185. The openings 185 permit depositions and/or removal of material in the locations 160 where the TFBs are being built. The compression plates (110, 180) are made of materials that can support the substrate 105 and maintain the substrate 105 flat until the manufacturing, assembly, and/or testing steps are completed. The compression plates (110, 180) can also be used to position the substrate 105 in one or more of the assembly steps.

FIG. 1B is an elevation view of thin, flat, electrically insulating substrate 105 that is fixed on a suction handler 110. In this embodiment, the compression plate 180 is removed providing greater access to the top surface 125 of the substrate 105, e.g. for material deposition.

FIG. 2A is an elevation view or cross section view of a substrate 105 with a first electrode (e.g. a cathode or an anode) 175 on each of one or more precursor battery structures. The substrate 105 is affixed and held flat against the handler 110 by one or more brackets 210 and/or suction applied through the suction holes 115.

Vias (typically 225) are cut through the substrate 105 and filled with a conductive material 225 including but not limited to copper (Cu), aluminum (Al), nickel (Ni), silver (Ag), a conductive adhesive, solder, and gold (Au). The vias 225 are made using known techniques.

Via 225A is a first via 225A electrically and physically connected 220A to the first electrode connection 130. Via 225B is a second via 225 electrically and physically connected 220B to the second electrode connection 135. The connections (220A, 220B) are made to the edges of the first and second electrode connections (130, 135 respectively). In some embodiments, the via 225 connections (220A, 220B) can overlap the edges of the first and second electrode connections (130, 135) to form a connection with less resistance. Therefore, the first electrode 175 is electrically connected through the first electrode connection (130, 220A) to the first via 225A.

FIG. 2B is an elevation view or cross section view of a substrate 105 with a first electrode (e.g. a cathode or an anode) 175 and an electrolyte 250 on each of one or more precursor battery structures. The electrolyte 250 is disposed on the first electrode 175 and can extend into the region 255 between the first 130 and second 135 electrode connections. However, the electrolyte 250 makes no electrical contact with either the first 130 or second 135 electrode connections. In some embodiments, there is a gap between the electrolyte 250 in the region 255 and the electrodes (130, 135). In some other embodiments, a dielectric, non-conducting spacer 256 is disposed in the region 255 so that the electrolyte 250 is in electrical or physical contact neither with the first 130 nor the second 135 electrode connection.

FIG. 2C is an elevation view or cross section view of a substrate 105 with one or more preliminary battery structures, each having a first electrode (e.g. a cathode or anode) 175, an electrolyte 250, and a second electrode (e.g. anode or cathode, respectively) 290. The second electrode 290 is deposited on the electrolyte 250 and at least part of the second electrode 290 is disposed on 295 the second 135 electrode connection. Therefore, the second electrode 290 is electrically connected through the second electrode connection (135, 220B) to the second via 225B.

There now are one or more TFBs on the substrate 105, each with a first electrode 175, electrolyte 250, and a second electrode 290 where the first 175 and second 290 electrodes are electrically connected to the first 225A and second 225B vias 225, respectively.

The materials making the first electrode 175, electrolyte 250, and second electrode 290 can be any known materials for making TFBs that are compatible for this purpose. They are applied in layers by known techniques. For example, the first electrode 175 can be a cathode 175 made of cathodic material including but not limited to a $LiCoO_2$ cathode. The electrolyte 250 is disposed between and electrically connected to the first 175 and second 290 electrode and is made of an electrolyte including but not limited to $LiP_xO_yN_z$ solid state electrolyte. Finally, the second electrode 290 can be an anode 290 made anodic material including but not limited to Li metal anode.

In some embodiments, the anode (as a first electrode) 175 is closer to the substrate 105 than the cathode (as second electrode) 290. In other embodiments, the cathode (as first electrode) 175 is closer to the substrate 105 than the anode (as second electrode) 290.

FIG. 3 is an elevation view of a layer 300 containing a substrate 105 with one or more battery structures 325 covered by an electrically insulating lamination layer 350. The battery structures 325 have two or more vias (225A, 225B, typically 225), a first electrode 175, an electrolyte 250, a second electrode 290, a non-conducting spacer 256 (optional), a first electrode connection 130, and a second electrode connection 135.

The battery structures 325 and the top surface 125 of the substrate 105 are covered with electrically insulating lamination layer 350 by known techniques including but not limited to CVD, PECVD, RFCVD, PVD, PLD, and LSMCD. Other methods are contemplated. The insulating lamination layer 350 is made of electrically insulating materials including but not limited to dielectric oxides ($SiO_x$), dielectric nitrides (e.g., SiN, SiBCN, SiCN, and SiBN), dielectric oxynitrides (e.g. SiOCN), SiCO, and SiC), or any combination thereof.

Figure 4:
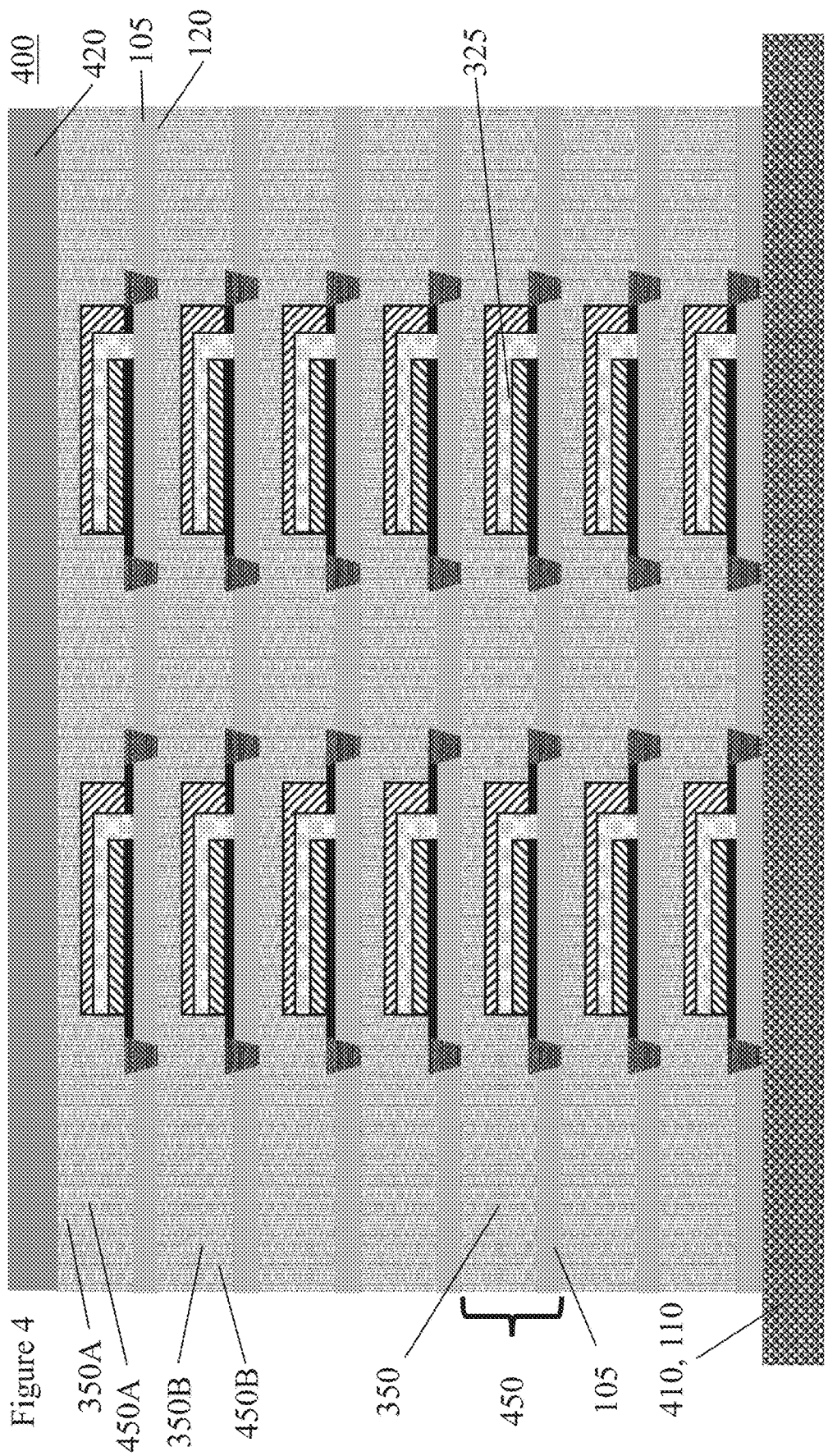
FIG. 4 is an elevation view of a multiple layer structure with each layer having one or more battery structures.

FIG. 4 is an elevation view of a multiple layer structure 400 with each battery layer 450 containing a substrate 105 and one or more battery structures 325 covered by an insulating lamination layer 350. (For clarity, the non-conducting spacer 256 will be eliminated from the battery structures 325 in remainder of the Figures.)

Each battery layer 450 of battery structures 325 is stacked upon another battery layer 450 until the multiple layer structure 400 is formed. For example, a handler like the suction handler 110 (shown in FIG. 3) would pick up a first layer 450A and place it upon a substrate cap 420 so that the insulation layer 350A of the first battery layer 450A bears on the substrate cap 420. The insulating lamination layer 350A can attach to the substrate cap 420, e.g. with an adhesive, using known methods. The substrate cap 420 is made of a flat, electrically insulating material including but not limited to: a ceramic, glass, dielectric oxides ($SiO_x$), dielectric nitrides (e.g., SiN, SiBCN, SiCN, and SiBN), dielectric oxynitrides (e.g. SiOCN), SiCO, and SiC), or any combination thereof.

In one embodiment, the suction handler 110 would release the first battery layer 450A that is attached to substrate cap 420. Then the suction handler 110 (or another suction handler 110) would pick, position, and place a second battery layer 450B upon the first 450A so that the insulating lamination layer 350B of the second battery layer 450 would bear on the bottom surface 120 of the substrate 105 of the first battery layer 450A. The insulating lamination layer 350B would attach to the bottom surface 120 of the substrate 105 of the first battery layer 450A and the suction handler 110 would release the second battery layer 450B.

The process repeats until the multiple layer structure 400 is formed. When the last battery layer 450 is positioned, placed, and attached, the handler (110, 410) can optionally either remain attached to serve as a handler 110 for the entire multiple layer structure 400 or a new handler 410 can be attached to the multiple layer structure 400.

Figure 5:
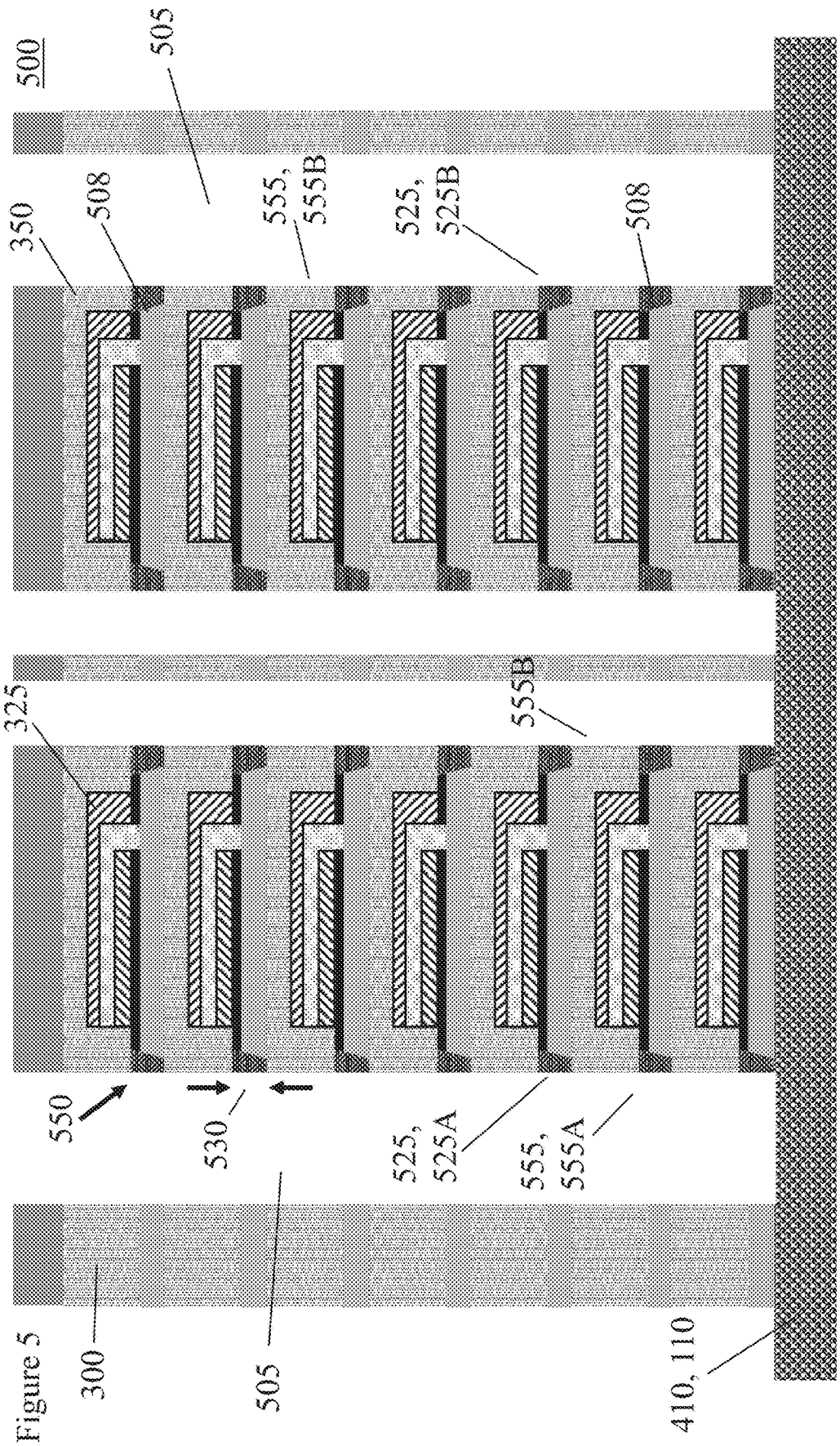
FIG. 5 is an elevation view of a multiple layer structure cut into singulated stacks.

FIG. 5 is an elevation view 500 of a multiple layer structure 400 cut into singulated stacks 550.

Spaces 505 are created in the multiple layer structure 400 by removing layers of material, e.g. by known directional etching and/or laser ablation techniques. In some embodiments, the material is removed from the substrate cap 420 down to the handler (410, 110). The spaces or voids 505 create singulate or separate stacks, i.e. stacked TFBs 550, containing a plurality of one or more thin film batteries 325, e.g. the TFBs 325 can be in a layer 450 in a direction into and out of the Figure.

In some embodiments, the material is removed to vertically cut the vias 225 such that a via cross section 525 of the vias 225 is exposed on the sides 555 of the stacked TFBs 550. The exposed via cross section 525 provides a large conductive cross section 525 or edge connection 525 on the sides 555 of the stacked TFBs 550. Each of one or more edge connections 525 electrically connects to the respective electrode connection (130, 135) of the batteries 325 in the respective battery layer 450 stacked in the stacked TFB 550. In some embodiments, the exposed via cross section 525, i.e. edge connection 525, has a height 530 at least equal to the thickness 108 of the substrate 105.

As a result, each of the edge connections 525 on an edge 508 of a substrate 105 and on the side 555 of the stacked TFB 550 electrically connects to a respective electrode (175, 290) in a TFB 325 disposed on the substrate 105 in the respective battery layer 450.

In some embodiments, all of one type of edge connection 525 for each TFB 325 are on a first edge of the substrate 105. For instance, all the edge connections 525A connected to a first type of electrode are on a first side 555A of the stacked TFB 550 and all the edge connections 525B connected to a second type of electrode are on a second side 555B of the stacked TFB 550. For example, if the first electrode is a cathode and all TFBs 325 are aligned in the same way in the stacked TFB 550, all the cathodes (first electrode) 175 would have a cathode electrode connection 130 connected to a first edge connection 525A on a first side 555A of the stacked TFB 550. In like manner, each of all the anodes 290 (second electrode) 290 would have an anode electrode connection 135 connected to a second edge connection 525B on a second side 555B of the stacked TFB 550. The result is that each of all the cathodes 175 in the stacked TFB 550 are connected through the respective cathode electrode connection 130 to a respective cathode edge connection 525A on a cathode side 555A of the stacked TFB 550 and all the anodes 290 in the stacked TFB 550 are connected through the respective anode electrode connection 135 to a respective anode edge connection 525B on an anode side 555B of the stacked TFB 550.

Other configurations are envisioned. For example, both the cathode edge connection 525A and the anode edge connection 525B can be on the same substrate 105 edge 508, the cathode edge connection 525A and the anode edge connection 525B can be on an adjacent substate 105 edges 508, and the cathode edge connection 525A is on one or more cathode substrate 105 edges 508 and the anode edge connection 525B is on one or more anode substrate 105 edges 508 where the cathode and anode substrate edges are opposite substate edges 508, e.g. they are across the substrate 105 from one another.

It is noted that the electrically insulating lamination layer 350 covers: the cathode electrode connection 130 (or 135), the anode electrode connection 135 (or 130), the anode 290 (or 175), the electrolyte 250, and the cathode 175 (or 290). The insulating lamination layer 350 does not cover the cathode edge connections or anode edge connections 525. The edge connections 525 are open for connection on the sides 555 of the stacked TFB 550.

Figure 6:
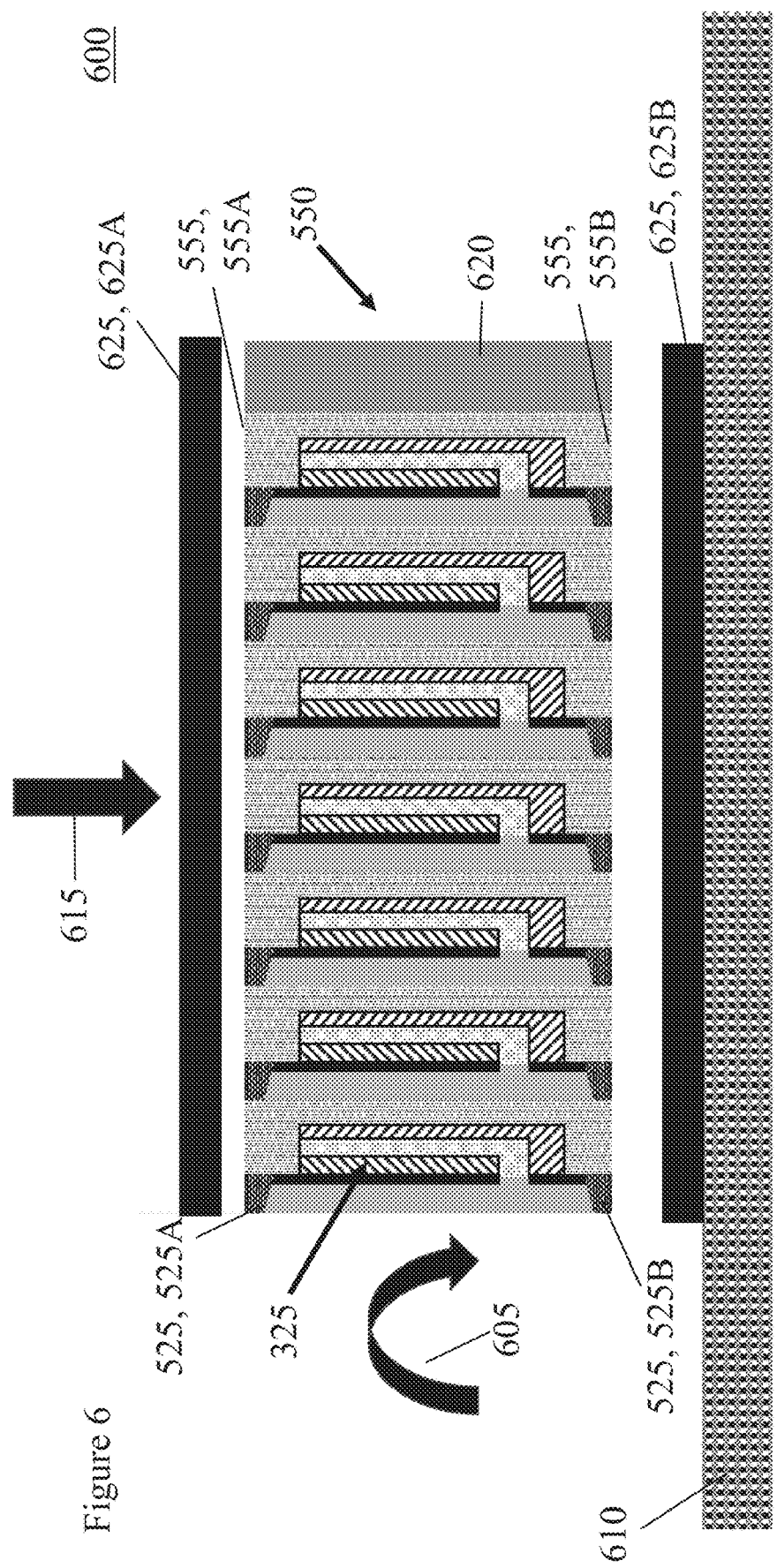
FIG. 6 is an elevation view of a rotated stacked TFB positioned to be connected to a first and second stack external connection to create a TFB cell stack.

FIG. 6 is an elevation view of a stacked TFB 550 rotated 605 to be positioned, e.g. on a side 555, and to be connected to a first (625, 625A) and second (625, 625B) stack external connection to form a TFB cell stack 600. In some embodiments (as shown in FIG. 6), the handler (110, 410) is removed from the stacked TFB 550. The handler (110, 410) may have been used to pick and place the stacked TFB 550. In the embodiment shown, a portion of the substrate cap (420, 620) remains on the stacked TFB 550. The substrate cap (420, 620) optionally could have been removed, e.g. with a chemical mechanical polishing (CMP), at an earlier step in the process.

A first stack external connection (625, 625A), e.g. a stack external cathode connection, is connected on a first side (555, 555A) and connects two or more of the first edge connections (525, 525A), e.g. a cathode edge connection (525, 524A). A second stack external connection (625, 625B), e.g. a stack external anode connection, is connected on a second side (555, 555B) and connects two or more of the second edge connections (525, 525B), e.g. an anode edge connection (525, 524B).

The stack external connections 625 are a conductive material that electrically connects the first edge connections (525, 525A) together and separately the second edge connections (525, 525B) together. In some embodiments, with the TFBs 325 aligned in the same direction, the first 625A and second 625B stack external connections 625 connect the TFBs 325 in the stacked TFB 550 in parallel electrically.

The conductive materials making the external connections 625 include but are not limited to Cu, Al, Ni, Ag, Pt, Pd a conductive adhesive, Au, and solder. In some embodiments, the stack external connections 625 are configured as a sheet covering one or more sides 555 of the stacked TFBs 550. In other embodiments, the stack external connections 625 can be a strip or wire that connects the edge connections 525 together electrically.

The conductive materials 625 making the stack external connections 625 are deposited on the sides 555 of the stacked TFBs 550 by known methods including but not limited to CVD, PECVD, RFCVD, PVD, PLD, LSMCD, plating, and sputtering. The conductive material 625 can also be applied as a conductive adhesive by known mechanical application techniques. In some embodiments, the conductive material (625, 625B) can be applied to one or more stack handlers 610 and forced 615 onto one or more sides 555 of the stacked TFBs 550 to physically and electrically attach the conductive material 625 to the edge connections 525 by known techniques like thermal compression.

Figure 7:
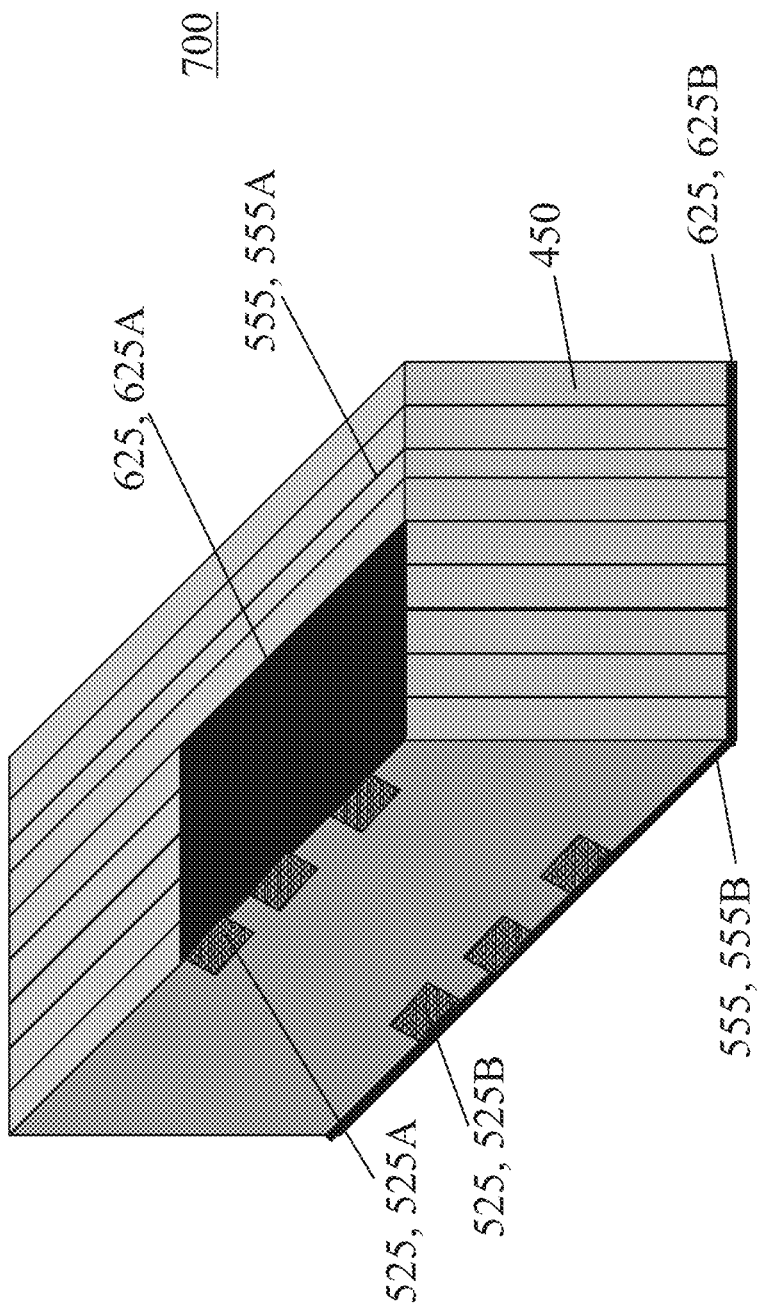
FIG. 7 is an isometric view of a TFB cell stack showing a plurality of battery layers connected by stack external connections.

FIG. 7 is an isometric view of a TFB cell stack 700 showing a plurality of battery layers 450. The first stack external connection (625A, 625) connects two or more of the edge connections (525A, 525) on a first side (555A, 555) of the TFB cell stack 700. The second stack external connections (625B, 625) connects two or more of the edge connections (525B, 525) on a second side (555A, 555) of the TFB cell stack 700. Note that the first stack external connection 625A is only partially shown in order to make the battery layers 450 more visible.

FIG. 8A is a drawing of a plurality of stacked TFB cell stacks 700 being stacked into a TFB module 875. The TFBs cell stacks 700 are oriented in a "translation symmetry" where the substrate 105 bottom 120 of a first TFB cell stack 700 is placed adjacent to the insulating lamination layer 350 of a second TFB cell stack 700. In some embodiments, the TFB cell stacks 700 are oriented so that all the first stack external connections (625A, 625), e.g. those connected to the cathodes 175, and all the second stack external connections (625B, 625), e.g. those connected to the anodes 290, are each substantially coplanar. A plurality of TFB cell stacks 700 can be oriented in this manner. (Note that the first stack external connections 625A are only partially shown so the battery layers 450 are visible.)

The oriented TFB cell stacks 700 are then moved 815 together. Each of the TFB cell stacks 700 is physically attached to the TFB cell stack 700 adjacent, e.g. with an adhesive applied to the interface between the substrate bottom 120 and insulating laminating layer 350 interfaces.

FIG. 8B is a drawing 850 of a TFB module 875 after the TFB cell stacks 700 are attached to one another. A first module external connection (825, 825A) is disposed on a first module side (855, 855A) that electrically connects the first stack external connections (625A, 625). A second module external connection (825, 825B) is disposed on a second module side (855, 855B) that electrically connects the second stack external connections (625B, 625). The module external connections 825 can be a silver (Ag) paste, solder, or any other known electrical connection method.

In some embodiments, the stack external connections 625 do not have to be applied because the module external connections 825 will electrically connect the edge connections 525.

In some embodiments, the module creation in FIGS. 8A and 8B is not done and the TFB cell stacks 700 go directly to the process steps described in FIGS. 10A and 10B.

The battery modules (modules) 875 can be placed on a substrate 810 or a module handler 810.

FIG. 9 is an elevation view of a TFB module 875 on a substrate 910. The substrate is made of mica or ceramic or other structural, electrically insulating material. The TFB module 875 has a plurality of battery layers 450 with all the first electrodes 170 connected through edge connections 525 (one edge connector 525 shown as typical) to the first module external connection (825, 825A) and all the second electrodes 290 connected edge connections 525 to the second module external connection (825, 825B). In some embodiments, all the battery structures 325 within the battery layers 450 of the module 875 are electrically connected in parallel.

FIG. 10A is an elevation view of a TFB module 1000 with a hermetic sealing cap 1050 as a first external module connection or first battery pole 1050. The hermetic sealing cap 1050 can be a metallic coating that seals all sides of the TFB module 900 except the surface covered by the substrate 910. The hermetic sealing cap 1050 is made to keep moisture away from the TFB module 875 and is electrically connected to the first module external connection (825, 825A). Therefore, any point on the hermetic sealing cap 1050 is in electrical contact with the first electrode 175 of all the battery structures 325 within the battery layers 450 of the module 875.

FIG. 10B is an elevation view of a TFB module 1050 with a hermetic sealing cap 1050 as a first external battery pole 1050 and a second external battery pole 1025 passing through a substrate 910. The second external battery pole 1025 is in electrical contact with the second electrode 290 of all the battery structures 325 within the battery layers 450 of the module 875 and provides the second connection to the module 1050.

Figure 11A:
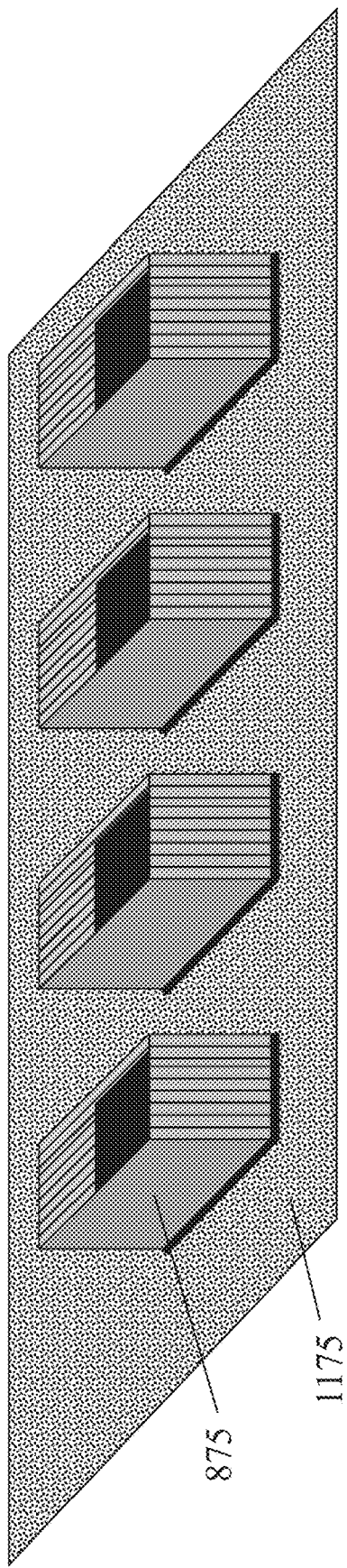
FIG. 11A is an isometric view of a plurality of TFB modules on a substrate in a batch process.

FIG. 11A is an isometric view of a plurality of TFB modules 875 on a substrate 1175 in a batch process 1100. A plurality of battery modules 875 is arranged on a substrate 1175 in a "translation symmetry". While only one row of battery modules 875 is shown, more than one row of battery modules 875 is envisioned. The substrate 1175 can be a large mica or ceramic substrate. Any other non-electrically conductive and structurally supportive material can be used, such as glass, silicon, and metal coated with an electrical insulator.

Figure 11B:
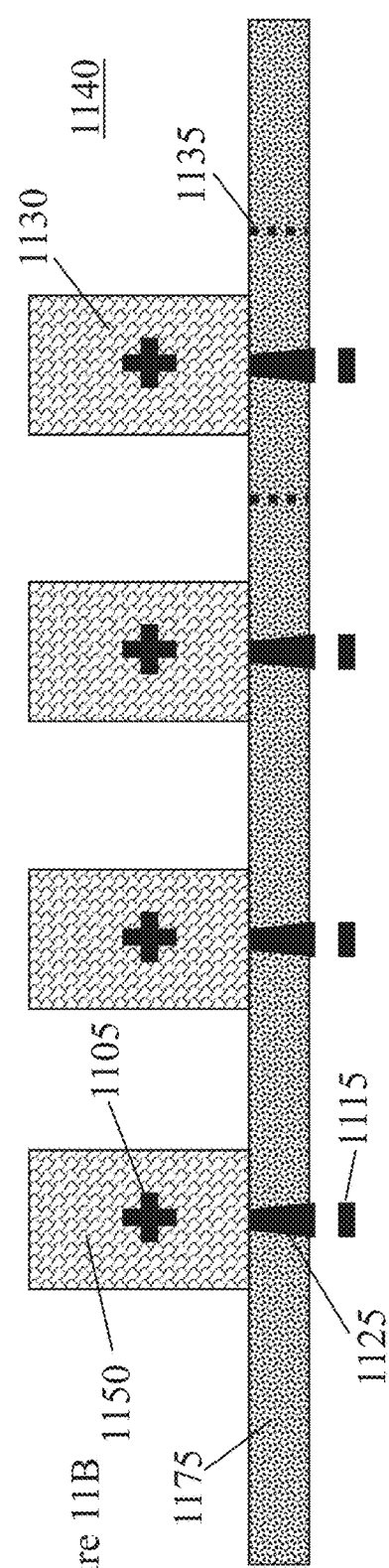
FIG. 11B is an elevation view of a plurality of TFB modules on a substrate each with a hermetic sealing cap as a first battery pole and a second battery pole passing through the substrate.

FIG. 11B is an elevation view of a plurality of TFB modules 1150 on a substrate 1175 in a batch process step 1140 where each of the TFB modules 875 has an electrically conductive, hermetic sealing cap 1150 attached as a first external battery pole (1105, 1150) to each of the first electrodes 175. Holes are drilled, etched, cut or created, e.g. by etching or laser ablation or other means, through the substrate 1175 and an electrical connection 1125 is made to form each of the second battery poles 1115, respectively, by filling the holes with conductive materials 1125.

Once the TFB modules 875 are hermetically capped 1150 and the external battery pole connections (1105, 1115) are made, the batteries 1130 can be singulated by cutting 1135 the substate 1175 by known techniques, e.g. precision laser ablation.

Figure 12:
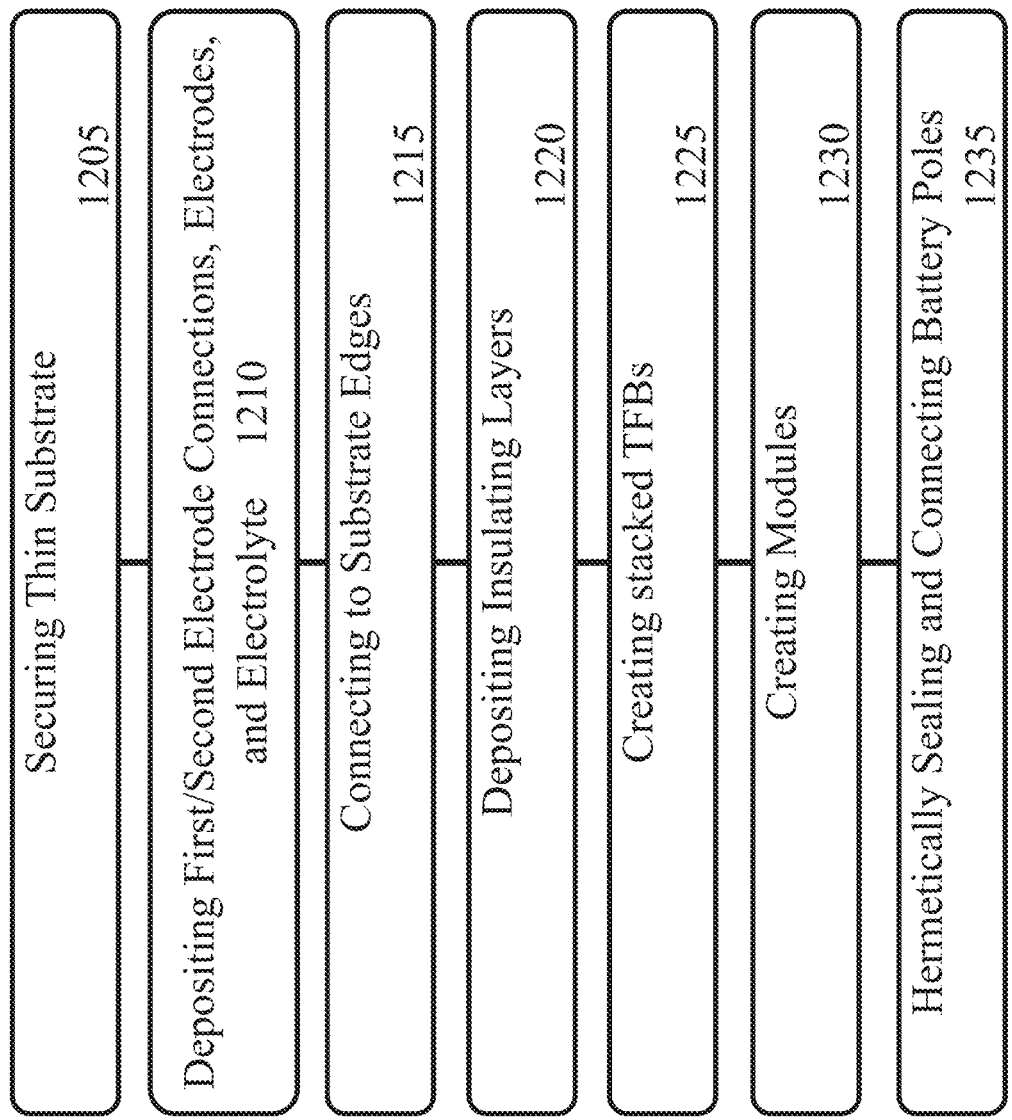
FIG. 12 is a flow chart of a process of making one or more TFBs.

FIG. 12 is a flow chart of a process 1200 of making one or more TFBs 325 in a stacked TFB 550 and/or a TFB module (1050, 1150).

The process 1200 begins with the step 1205 of securing a thin substrate 105, e.g. to a handler 110 or to sandwich the thin substrate 105 between a handler 110 and a compression plate 180.

In step 1210, the process 1200 deposits the electrode connections (130, 135), electrodes (175, 290), and electrolytes 250 on the substrate 105 to form the battery structures 325.

In step 1215 of the process 1200, the vias 225 are formed and connected to the electrode connections (130, 135) to later form the edge connections 525 on the substrate 105 edges 508.

In step 1220 of the process 1200, the insulating lamination layer 350 is deposited completing the formation of a battery layer 450.

In step 1225 of the process 1200, the TFB cell stacks 700 are created by creating the multiple layer structure 400 of battery layers 450, singulating the stacked TFB 550 from the multiple layer structure 400 so that the cross sections 525 of the vias 225 are exposed on the stacked TFB 550 sides 555, and connecting the via cross sections 525 together by forming/depositing the stack external connections 625. In some embodiments, the via cross sections 525 are connected if they are connected to the same type of electrode (175, 290).

Step 1230 of the process 1200 optionally creates modules 875 by aligning the TFB cell stacks 700 together, attaching the TFB cell stacks 700 to one another 815, and electrically connecting the appropriate via cross sections 525 together with the module external connections 825. In some embodiments the via cross sections 525 are directly connected by the module external connections 825. In some embodiments, the stack external connections 625 are connected by the module external connections 825.

Step 1235 of the process 1200 hermetically seals the module 875 with a conductive/metallic hermetic sealing cap 1050 that is electrically connected to the stack/module external connections (625, 825) and forms one battery pole (1105, 1150) of the stacked TFB 550 battery and/or the module 875. The second battery pole 1115 is formed by creating vias 1125 through the substrate 1175 so the vias 1125 electrically connect to the appropriate external connections (625, 825).

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein was chosen to explain the principles of the embodiments and the practical application or technical improvement over technologies found in the marketplace or to otherwise enable others of ordinary skill in the art to understand the embodiments disclosed herein. Devices, components, elements, features, apparatus, systems, structures, techniques, and methods described with different terminology that perform substantially the same function, work in the substantial the same way, have substantially the same use, and/or perform the similar steps are contemplated as embodiments of this invention.

We claim:

1. A thin film battery (TFB) layer comprising:
   a substrate, having a top surface, a bottom surface, a substrate thickness, and one or more substrate edges;
   a first electrode connection disposed on the top surface;
   a second electrode connection disposed on the top surface, the second electrode connection not electrically connected to the first electrode connection;
   a first electrode electrically connected to the first electrode connection, at least part of the first electrode disposed on the first electrode connection;
   a second electrode electrically connected to the second electrode connection, at least part of the second electrode disposed on the second electrode connection;
   an electrolyte, at least part of the electrolyte disposed between and electrically connected to the first and second electrodes;
   a first edge connection disposed on one of the substrate edges, the first edge connection being physically and electrically connected to the first electrode connection;
   a second edge connection disposed on one of the substrate edges, the second edge connection being physically and electrically connected to the second electrode connection;
   a first stack external connection electrically connecting one or more of the first edge connections, the one or more of the first edge connections being electrically connected at a respective substrate edge on which the first edge connection is disposed, the first stack external connection forming a first battery pole; and
   a second stack external connection, electrically connecting one or more of the second edge connections, the one or more of the second edge connections being electrically connected at a respective substrate edge on which the second edge is disposed, the second stack external connection forming a second battery pole,
   wherein the first electrode and the second electrode are within the TFB, respectively,
   wherein the substrate is between 0.5 microns and 5 microns in thickness, and
   wherein the substrate has a root mean squared (RMS) of surface roughness between 1 nanometer (nm) and 250 nanometer (nm) per square millimeter (mm$^2$) of surface area of the substrate.

2. A TFB layer, as in claim 1, further comprising an electrically insulating lamination disposed on the substrate and covering the first electrode connection except for the first edge connection, the second electrode connection except for the second edge connection, the first electrode, the electrolyte, and the second electrode.

3. A TFB layer, as in claim 1, where the substrate thickness is between 5 microns and 80 microns.

4. A TFB layer, as in claim 1, where the substrate is made of one or more of the following materials: mica, Yttrium stabilized Zirconia (YSZ), ceramic, metal with an electrically insulating coating, and insulating materials dielectric oxides (e.g., silicon oxide, SiOx); dielectric nitrides (e.g., silicon nitride (SiN), silicon boron nitride (SiBN), silicon Boron Carbon Nitride (SiBCN), silicon Carbon Nitride (SiCN); dielectric oxynitrides, (e.g. silicon Oxygen Carbon Nitride (SiOCN), Silicon Carbon Oxide (SiCO), and Silicon Carbide (SiC)); or other dielectric combinations thereof.

5. A TFB layer, as in claim 1, where the first edge connection and the second edge connection are configured in one or more of the following ways: both the first and second edge connection are on a same edge of the substrate, the first and second edge connections are each on an adjacent substate edge, and the first connection is on one or more first substrate edges the second edge connection is on one or more second substrate edges and the first and second edge connections are opposite substate edges.

6. A TFB layer, as in claim 1, where the first electrode is an anode and is closer to the substrate than the second electrode which is a cathode.

7. A TFB layer, as in claim 1, where the first electrode is a cathode and is closer to the substrate than the second electrode which is an anode.

8. A structure of Thin Film Battery (TFB) layers, the structure comprising:
   a plurality of battery layers, each battery layer comprising:
      a substrate, having a top surface, a bottom surface, and one or more substrate edges;
      a first electrode connection disposed on the top surface;
      a second electrode connection disposed on the top surface, the second electrode connection not electrically connected to the first electrode connection;
      a first electrode electrically connected to the first electrode connection, at least part of the first electrode disposed on the first electrode connection;

a second electrode electrically connected to the second electrode connection, at least part of the second electrode disposed on the second electrode connection;

an electrolyte, at least part of the electrolyte disposed between and electrically connected to the first and second electrodes;

a first edge connection disposed on one of the substrate edges, the first edge connection being physically and electrically connected to the first electrode connection;

a second edge connection disposed on one of the substrate edges, the second edge connection being physically and electrically connected to the second electrode connection;

an electrically insulating lamination disposed on the substrate and covering the first electrode connection except for the first edge connection, the second electrode connection except for the second edge connection, the first electrode, the electrolyte, and the second electrode; and wherein the first electrode and the second electrode are within one of the TFB layers, respectively, and further comprising:

a first stack external electrical connection connecting two or more of the first edge connections;

a second stack external electrical connection connecting two or more of the second edge connections, wherein the first stack external connection electrically connects each of the first edge connections at a respective substrate edge on which the first edge connection is disposed, the first stack external connection forming a first battery pole, wherein the second stack external connection, electrically connects each of the second edge connections at a respective substrate edge on which the second edge is disposed, the second stack external connection forming a second battery pole, wherein the substrate is between 0.5 microns and 5 microns in thickness, and wherein the substrate has a root mean squared (RMS) of surface roughness between 1 nanometer (nm) and 250 nanometer (nm) per square millimeter ($mm^2$) of surface area of the substrate.

9. A structure, as in claim 8, that is a module of two or more integrated battery structures or stacks.

10. A structure, as in claim 8, further comprising a hermetical seal sealing the stack, electrically connected to the first stack external electrical connection and forming a first battery pole and a second battery pole connected to the second stack external electrical connection.

11. A structure, as in claim 8, where one or more of the second electrode connections is electrically insulated respectively from the first electrode connection by a non-conducting spacer.

12. A structure, as in claim 8, where two or more of the battery layers is oriented in a translation symmetry.

13. A structure, as in claim 12, where the translation symmetry is the placement of the bottom surface of the substrate of each of one or more first battery layers adjacent to an insulating lamination layer covering a second battery layer.

14. A structure, as in claim 8, where each of the first edge connections are electrically connected to a cathode and are coplanar and the first stack external electrical connection connects two or more of the cathodes through the respective first edge connection.

15. A structure, as in claim 8, where each of the second edge connections are electrically connected to an anode and are coplanar and the second stack external electrical connection connects two or more of the anodes through the respective second edge connection.

16. A structure, as in claim 8, where a module external electrical connection serves as one of the first stack external connection and the second stack external electrical connection.

17. A structure, as in claim 16, where the module external electrical connection is a conductive substrate.

* * * * *